United States Patent [19]

Belart

[11] Patent Number: 4,582,365
[45] Date of Patent: Apr. 15, 1986

[54] HYDRAULIC BRAKE SYSTEM

[75] Inventor: Juan Belart, Walldorf, Fed. Rep. of Germany

[73] Assignee: ITT Industries, Inc., New York, N.Y.

[21] Appl. No.: 631,629

[22] Filed: Jul. 17, 1984

[30] Foreign Application Priority Data

Aug. 4, 1983 [DE] Fed. Rep. of Germany ....... 3328104

[51] Int. Cl.$^4$ .................. B60T 8/44; B60T 13/00; B60T 11/08; B60T 11/28
[52] U.S. Cl. .................. 303/114; 60/547.1; 60/575; 60/578; 60/589
[58] Field of Search .......... 60/547.1, 575, 578, 60/589; 303/92, 110, 113, 114, 116

[56] References Cited

U.S. PATENT DOCUMENTS

| | | | |
|---|---|---|---|
| 4,415,210 | 11/1983 | Belart et al. | 303/92 X |
| 4,492,413 | 1/1985 | Belart et al. | 303/92 |
| 4,521,061 | 6/1985 | Belart et al. | 60/547.1 X |

*Primary Examiner*—Robert E. Garrett
*Assistant Examiner*—George Kapsalas
*Attorney, Agent, or Firm*—James B. Raden; William J. Michals

[57] ABSTRACT

A slip control hydraulic brake system for wheel brakes wherein a sliding booster piston and a second piston form a working chamber with hydraulic pressure that acts upon a wheel brake. The booster piston and the brake system housing form two annular chambers, the second annular housing chamber larger than the first, whereby upon actuating travel of the booster piston the first annular housing chamber increases in volume and the second annular housing chamber decreases in volume.

4 Claims, 1 Drawing Figure

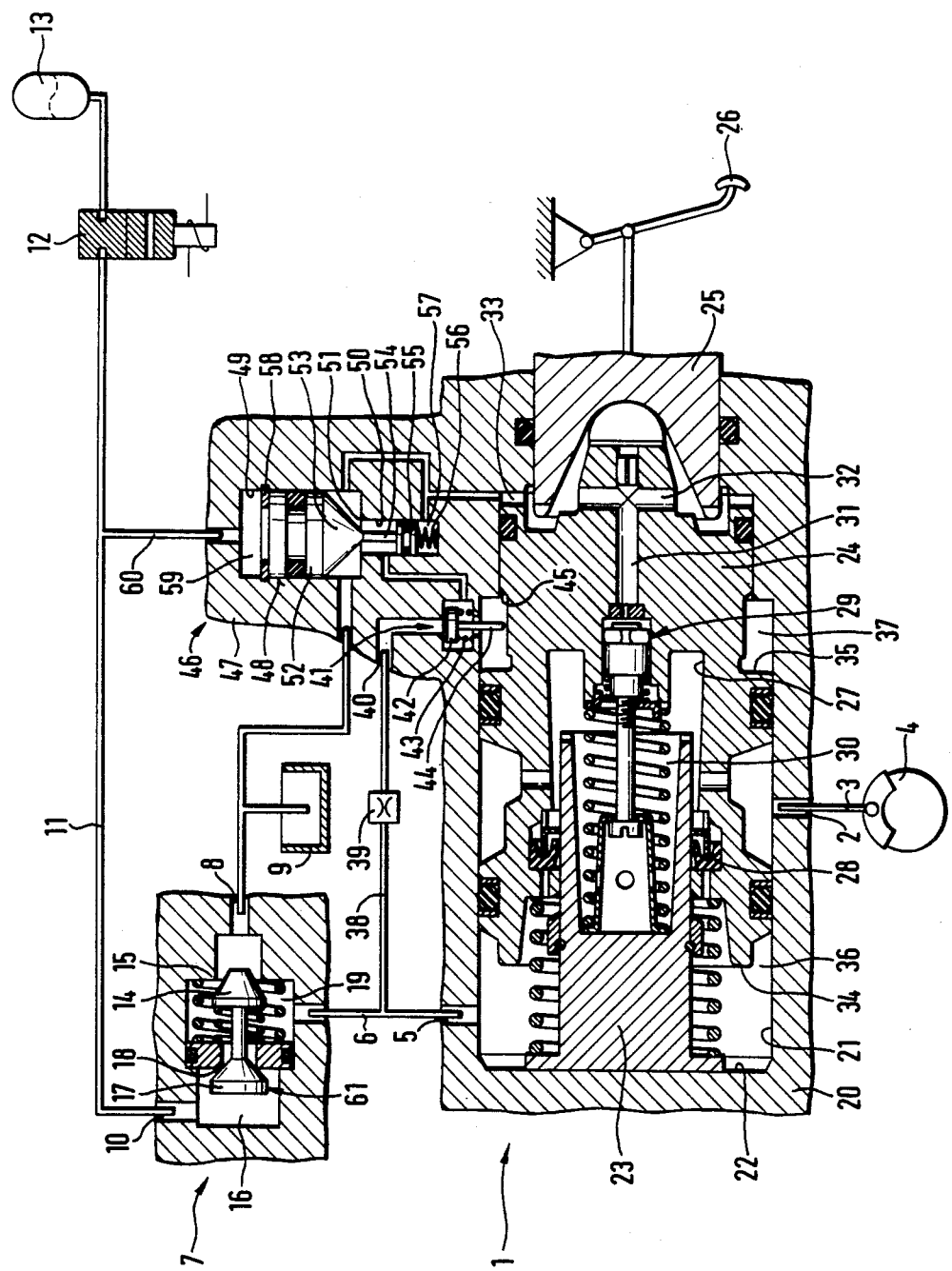

HYDRAULIC BRAKE SYSTEM

BACKGROUND OF THE INVENTION

The present invention relates to a vehicular hydraulic brake system with slip control, wherein a booster piston which is preferably pressurizable by means of an auxiliary pressure is slidably guided in a housing, wherein a second piston is adapted to be coupled with the piston in the direction of actuation and pressurizable in opposition to the direction of actuation, wherein the two piston parts form within the housing a chamber of varying volume associated with at least one wheel brake, and wherein the annular surface of the housing which is pressurizable in opposition to the direction of actuation is connected to its pedal-near annular surface via a throttling channel and the pedal-near effective surface is smaller than the pedal-remote effective surface.

In a brake system according to the prior art a booster piston which is preferably pressurizable by means of an auxiliary pressure is displaced in the direction of actuation when the braking pedal is depressed, the working chamber confined inside the housing by means of the piston parts thereby being reduced while the pressure is being increased. The pressure built up in the working chamber thereby propagates to at least one wheel brake monitored by slip control electronics.

When critical slip values occur at the vehicle wheel assigned to the wheel brake, a switch valve which is located in a hydraulic connection between a hydropneumatic pressure accumulator and a annular housing chamber confined by the pedal-remote annular surface of the positioning sleeve is switched over. Upon actuation of the switch valve, the pressure of the pressure accumulator is transmitted to a change-over valve which first separates the housing chamber confined by the larger effective surface of the housing from the unpressurized supply reservoir and then connects it directly to the pressure accumulator. A pressurization of this larger volume annular housing chamber results in a displacement of the positioning sleeve in opposition to the direction of actuation, the braking pedal being displaced, if necessary, into the brake release direction.

On pressurizing the housing chamber connectable to the pressure accumulator, a housing annular chamber which is confined by a smaller effective surface of the housing is also pressurized, the pressure built up in the respective housing annular chamber being higher, due to the differing volumes, and being able to gradually adapt to that in the larger volume annular housing chamber connectable to the pressure accumulator via a throttling channel. As a result, the reset movement of the positioning sleeve is delayed, so that an abrupt reset action will be prevented.

In the brake system described above, a stroke limitation is required during the control action in order to ensure a minimum volume in the working chamber of the brake pressure generator, since a failure of the pressure accumulator or components of the slip control electronics, even during the control operation, cannot be excluded. Even in an incident such as this, occuring during a control operation, it must be ensured that the working chamber is pressurizable such that the prescribed minimum deceleration of the vehicle is achieved, and that solely by the force acting upon the brake pedal. Practice has shown that it is sufficient to limit the actuating travel of the booster piston to approximately half of its total stroke. Consequently, there is no need to reset the booster piston during the control operation when it has effected less than half of the maximum stroke.

It is, therefore, an object of the present invention to improve a brake system initially referred to, with the aid of constructively simple means, such that a reset action of the braking pedal and/or the booster piston will only set in when the minimum reserve stroke of the brake force generator is exceeded during the control operation.

SUMMARY OF THE INVENTION

According to the invention, this object will be achieved by a lock valve arranged in the throttling channel. As long as the lock valve assumes a closed position, the throttling channel between both housing chambers is thus inefficient. The pedal-near effective surface of the booster piston thereby confines a self-contained housing annular chamber by means of which a displacement of the positioning sleeve in opposition to the direction of actuation is prevented in the event of a pressurization of its pedal-remote end face. In an expedient constructive embodiment, the throttling channel is formed in the hydraulic brake system housing.

It is further provided that the lock valve is switchable in dependence upon the actuation travel of the booster piston. As a result, the lock valve remains in an open position as long as the actuating travel corresponding to the desired minimum stroke reserve is not exceeded. After exceeding the minimum reserve stroke, the lock valve assumes an open position in which both housing chambers are interconnected via the throttling channel. If a control phase begins in such an operating state of the hydraulic brake system, the booster piston will be reset up to a point where the pressure fluid volume contained in the working chamber corresponds to the minimum reserve. As soon as this point is reached, the lock valve, in turn, assumes an open position in which the throttling channel is ineffective and a displacement of the booster piston in opposition to the actuating force is excluded. A constructively advantageous embodiment of the present invention is achieved in that a tilting valve is arranged inside the housing chamber confined by the pedal-near effective surface of the booster piston, said tilting valve being switchable through the intermediary of a ramp shaped at the pedal-near piston part. In such a construction, the lock valve is thus designed as a tilting valve disposing of an actuating tappet which automatically establishes the desired position of the lock valve in dependence upon the actuating stroke. The switch point of the lock valve is preferably fixed to half of the maximum stroke of the hydraulic brake system. However, the ramp shaped at booster piston can easily be arranged such that the switch point of the lock valve is already reached at an actuating travel which is less than half of the maximum stroke of the hydraulic brake system, as a result whereof a greater pressure fluid volume is available in the working chamber of the hydraulic brake system for an emergency actuation of the brake system.

A particularly advantageous embodiment of the present invention further provides that the smaller volume annular housing chamber housing the tilting valve is connected to an unpressurized supply reservoir via a normally open cut-off valve. The smaller volume housing annular chamber normally disposes of a hydraulic connection leading to the unpressurized supply reservoir, which connection is closable, if need be. A closing of this connection is particularly required when the lock valve assumes an open position and a reset of the booster piston up to the constructively predetermined switch point of the lock valve is to be effected. The actuation of the cut-off valve can, in principle, be carried out in various ways. It is, however, particularly easy to switch the cut-off valve into a closed position when the smaller volume annular housing chamber is pressurized. In this way, the cut-off valve is switchable in dependence upon the pressure, whereby the invention advantageously provides that a valve piston controlling the valve passage of the cut-off valve is pressurizable in the closed direction of the cut-off valve by means of the pressure adapted to be acted upon the larger volume annular housing chamber and loaded in the open direction by means of a pressure spring.

BRIEF DESCRIPTION OF THE DRAWING

An embodiment of the present invention will be described in more detail in the following by means of the drawing in which the single figure illustrates a hydraulic brake system in accordance with the principles of the present invention.

DETAILED DESCRIPTION

In the drawing, 1 designates a brake pressure generator which communicates with a wheel brake 4 of a vehicle wheel to be decelerated via a housing connection 2 and a pressure conduit 3. The brake pressure generator 1 provides a housing connection 5 which is connected to a change-over valve 7 via a pressure conduit 6. The change-over valve 7, in turn, provides a housing connection 8 which is in permanent communication with an unpressurized supply reservoir 9, and a housing connection 10 which is via a pressure conduit 11 associated with a switch valve 12 to which a hydropneumatic pressure accumulator 13 is connected. The switch valve 12 is designed as a two-way/two-position valve and is controllable by the slip control electronics not illustrated. Upon enabling of the slip control electronics 4, the switch valve is switched over thus permitting flow of pressure medium from the hydropneumatic pressure accumulator 13 via the switch valve 12 and the pressure conduit 11 to the housing connection 10 of the change-over valve 7.

The change-over valve 7, has a valve passage 14, 15 which is open in the state in which the brake system is without slip control, the housing connection 5 of the brake pressure generator 1 thus being in communication with the unpressurized supply reservoir 9. On pressurizing an inlet chamber 16 of the change-over valve 7, the valve passage 14, 15 assumes a closed position, so that the communication between the unpressurized supply reservoir 9 and the housing connection 5 of the brake pressure generator is interrupted. When the hydraulic pressure in the inlet chamber 16 of the change-over valve 7 further increases, a valve passage 17, 18 is opened, thus allowing the pressure prevailing in the pressure conduit 11 to be transmitted via an outlet chamber 19 to the housing connection 5 of the brake pressure generator 1.

The brake pressure generator 1 provides a housing 20 in which a cylinder bore 21 is arranged. A piston 23 whose diameter is smaller than that of the cylinder bore 21 bears against the bottom 22 of the cylinder bore 21 of the brake pressure generator 1. In the cylinder bore 21, a booster piston 24 which has a form-fit connection with an actuating piston 25 can be displaced, either by a hydraulic auxiliary pressure or by the force exerted on the brake pedal 26 alone. The booster piston 24 is provided with a blind-end bore 27, the diameter of the blind-end bore 27 corresponding mainly with the external diameter of the piston 23. Between the piston 23 and the booster piston 24, a sealing cup 28 is provided.

The booster piston 24 of the brake pressure generator 1 is further equipped with a central valve 29 which closes at a short actuating travel of the booster piston 24, so that a working chamber 30 of the brake pressure generator is separated from the unpressurized supply reservoir 9 via the pressure channels 31, 32 and the housing connection 33.

The piston 24 disposes of a larger-diameter annular surface 34 and of a smaller-diameter annular surface 35, the housing annular chambers 36, 37 confined by the annular surfaces 34, 35 being interconnected via a pressure medium channel 38 arranged in the housing 20. Inside the pressure medium channel 38, a throttle 39 is arranged between the peripheral annular chambers 36, 37. The pressure medium channel 38 leads to a housing connection 40 which is in communication with the peripheral annular chamber 37 of the brake pressure generator 1 via tilting valve 41. The tilting valve 41 comprises, essentially, a closure member 42 which is normally held by means of a pressure spring 43 in a position in which the pressure medium channel 38 is separated from the peripheral annular chamber 37. The tilting valve 41 further disposes of a valve tappet 44 which opens the tilting valve 41 when acted upon by a force in the direction of actuation of the brake pressure generator. At the right-hand end of the piston 24, as shown in the drawing, a peripheral ramp 45 is provided for the actuation of the tilting valve 41 and/or the valve tappet 44, said peripheral ramp moving into abutment with the end of the valve tappet 44 after a certain actuating travel of the piston 24 and thus bringing the tilting valve 41 into an open position.

A cut-off valve 46 comprising a housing 47 in which a stepped bore 48 is arranged is connected to the peripheral annular chamber 37 of the brake pressure generator 1. The stepped bore 48 disposes of a larger-diameter portion 49 and of a smaller-diameter portion 50, whereby a valve seat 51 is formed between the bore portions 49, 50, which valve seat constitutes together with a closure member 53 shaped at a valve piston 52 a valve passage. At the lower end of the closure member 53, as shown in the drawing, an extension 54 is formed which sealedly guides a piston portion 55 within the smaller-diameter bore portion 50. The piston portion 55 is loaded by a pressure spring 56 and confines a housing chamber 57 associated with the unpressurized supply reservoir 9. The valve piston 52 is spring-loaded in the open direction of the valve passage 51, 53 and preloaded in opposition to to a housing stop 58 by means of the pressure spring 56. The upper end face of the valve piston 52, as shown in the drawing, confines an inlet chamber 59 which has a hydraulic connection with the pressure conduit 11 via a pressure conduit 60.

The mode of operation of the brake system described above will be explained in more detailed hereinbelow, proceeding thereby from an inoperative braking position in which all movable parts are in the position shown in the illustration. When a force is exerted on the braking pedal 26, the piston 24 will be displaced relative to the piston 23 in the direction of actuation, the central valve 29 in the piston 24 being closed after a short actuating travel, so that the working chamber 30 of the brake pressure generator 1 is separated from the unpressurized supply reservoir 9. When the force on the braking pedal is increased, the piston 24 will now be displaced relative to the piston 23, reducing thereby the working chamber 30 of the brake pressure generator, as a result whereof a hydraulic pressure will be built up in the working chamber 30, which pressure will be transmitted to the wheel brake 4 via the pressure conduit 3. When the brakes are released, the displacement operations described will be reversed until the position of the movable parts illustrated in the drawing is regained.

If during a braking operation, a hydraulic pressure is built up in the working chamber 30 of the brake pressure generator 1 which entails that the vehicle wheel assigned to the vehicle brake 4 enters a critical slip range, this fact will be registered by the slip control electronics not illustrated in the drawing, as a result whereof a corresponding signal will be transmitted to the switch valve 12.

When the switch valve 12 is activated, a hydraulic communication will be established between the hydro-pneumatic pressure accumulator 13 and the pressure conduit 11, as a result whereof the cut-off valve first moves, due to the pressurization of the inlet chamber 59, into a position in which the valve passage 51, 53 is closed. The pressure of the hydraulic pressure accumulator 11 now prevailing in the pressure conduit 11 will be transmitted via the housing connection 10 of the change-over valve 7 to the inlet chamber 16 and will act on a piston 61 located in the change-over valve 7, which piston will, thereupon, move rightwards, as shown in the drawing, and close the valve passage 14, 15 so that the peripheral annular chamber 36 is separated from the unpressurized supply reservoir 9. When the valve piston 61 is further displaced, the valve passage 17, 18 will be opened, the pressure prevailing in the inlet chamber 16 thus propagating via the outlet chamber 19 and the pressure conduit 6 to the peripheral annular chamber 36.

The following explanation first proceeds on the assumption that the volume contained in the working chamber 30 of the brake pressure generator 1 is greater than the necessary volume reserve of the brake pressure generator 1 when the switch valve 12 is switched over and/or when critical slip values occur. In this case, the tilting valve 41 thus remains in the closed position when the control action starts. A reset of the piston 24 will thereby not be possible since the peripheral annular chamber 37 of the pressure generator 1 forms a closed hydraulic system from which no pressure fluid may escape.

If, on starting the control action and/or on changing over of the switch valve 42, the piston 24 has already been displaced in the direction of actuation such that the tilting valve 41 has been opened via the ramp 45 of the piston 24, a reset of the piston 24 will take place when the peripheral annular chamber 36 is pressurized via the pressure conduit 38 with the interposed throttled 39 until the tilting valve 41 again assumes a closed position in which the peripheral annular chamber 37 is hydraulically closed. When the piston 24 has reached this axial position in which a predeterminable volume reserve is enclosed in the working chamber of the brake pressure generator, the movement of the piston 24 opposing the actuating force will be interrupted, the relative position between the pistons 23, 24 thus remaining unchanged.

After having prevented an impending lock-up by means of a suitable pressure modulation in the wheel brake 4, the switch valve 12 will be switched back into its rest position as shown in the illustration, in which position the pressure conduit 11 is separated from the hydro-pneumatic pressure accumulator 13.

During the brake release operation, the displacement operations described above are again reversed until such time as the rest position of the movable parts, as illustrated in the drawing, is re-established.

What is claimed is:

1. A slip control hydraulic brake system for wheel brakes comprising:
    a brake pressure generator, a change-over valve, and a cut-off valve;
    said brake pressure generator including a displaceable booster piston and an actuating piston, said actuating piston connected to a brake pedal;
    said booster piston sealingly engaging a second piston thereby forming a working chamber;
    said working chamber hydraulically connected to an unpressurized supply reservoir by means of a normally open central valve, said working chamber also hydraulically connected to at least one wheel brake, whereby upon a predetermined actuating travel of said booster piston said central valve closes, thereby sealing the working chamber wherein said working chamber hydraulic pressure increases and said wheel brake is actuated;
    said booster piston and said housing forming a first annular housing chamber whereby said first annular housing chamber increases in volume as said booster piston is actuatingly displaced, said booster piston and said housing also forming a second annular housing chamber whereby said second annular housing chamber decreases in volume as said booster piston is actuatingly displaced, said first annular housing chamber being smaller than said second annular housing chamber;
    said second annular housing chamber hydraulically connected to said change-over valve whereby in a non-actuated position said second annular housing chamber is in hydraulic communication with the unpressurized supply reservoir by means of said change-over valve;
    said first annular housing chamber hydraulically connected to said cut-off valve whereby in said non-actuated position said first annular housing chamber is in hydraulic communication with the unpressurized supply reservoir by means of said cut-off valve;
    said change-over valve and said cut-off valve each hydraulically connected to a hydro-pneumatic pressure accumulator by means of a normally closed switch valve, said switch valve under control of slip control electronics, whereby upon actuation of said switch valve said change-over valve disconnects said second annular housing chamber from the unpressurized supply reservoir and said change-over valve hydraulically connects said second annular housing chamber to said hydro-pneumatic pressure accumulator, and said cut-off valve disconnects said first annular housing chamber from said unpressurized supply reservoir;
    said first annular housing chamber hydraulically connected to said second annular housing chamber by means of a normally closed tilting valve whereby upon actuation of said tilting valve hydraulic communication between said second annular housing chamber and said first annular housing chamber is established.

2. The slip control hydraulic brake system of claim 1, wherein said hydraulic connection between said second annular housing chamber and said first annular housing chamber is governed by a throttle.

3. The slip control hydraulic brake system of claim 2, wherein said cut-off valve includes an inlet chamber hydraulically connected to said switch valve, wherein upon actuation of said switch valve hydraulic pressure accumulates in said inlet chamber from said hydro-pneumatic pressure accumulator, said accumulated hydraulic pressure acting upon a valve piston slideably positioned in a stepped bore causing a pressure spring to contract thus engaging a closure member of a valve seat and thereby disconnecting said first annular housing chamber from said unpressurized supply reservoir.

4. The slip control hydraulic brake system of claim 2, wherein said change-over valve includes an inlet chamber hydraulically connected to said switch valve, wherein upon actuation of said switch valve hydraulic pressure accumulates in said inlet chamber from said hydro-pneumatic pressure accumulator, said accumulated pressure acting upon a valve piston slideably positioned in a stepped bore causing a first change-over valve spring to contract thus engaging a first closure member of said valve piston against a valve seat thereby disconnecting said second annular housing chamber from said unpressurized supply reservoir;

said valve piston also including a second closure member which in a normally closed position disconnects said second annular housing chamber from said inlet chamber by engaging a valve gasket tensioned by a second change-over valve spring, wherein upon a further increase of accumulated pressure in said inlet chamber said second change-over valve spring contracts establishing hydraulic communication between said inlet chamber and said second annular housing chamber.

* * * * *